United States Patent
Farach-Colton et al.

(10) Patent No.: US 7,296,016 B1
(45) Date of Patent: Nov. 13, 2007

(54) SYSTEMS AND METHODS FOR PERFORMING POINT-OF-VIEW SEARCHING

(75) Inventors: Martin Farach-Colton, New York, NY (US); Monika H. Henzinger, Menlo Park, CA (US); Bay-Wei Chang, Foster City, CA (US)

(73) Assignee: Google Inc., Mountain View, CA (US)

( * ) Notice: Subject to any disclaimer, the term of this patent is extended or adjusted under 35 U.S.C. 154(b) by 452 days.

(21) Appl. No.: 10/385,752

(22) Filed: Mar. 12, 2003

Related U.S. Application Data (60) Provisional application No. 60/363,558, filed on Mar. 13, 2002.

(51) Int. Cl.
*G06F 7/00* (2006.01)
*G06F 17/30* (2006.01)

(52) U.S. Cl. .................. 707/5; 707/2; 707/3; 707/4
(58) Field of Classification Search ............. 707/3, 707/4, 5, 2; 709/218, 219
See application file for complete search history.

(56) References Cited

U.S. PATENT DOCUMENTS

| | | | |
|---|---|---|---|
| 5,754,938 A | 5/1998 | Herz et al. | |
| 5,802,292 A | 9/1998 | Mogul | |
| 5,875,429 A | 2/1999 | Douglas | 704/275 |
| 5,937,397 A | 8/1999 | Callaghan | |
| 5,983,227 A | 11/1999 | Nazem et al. | 707/10 |
| 6,006,225 A | 12/1999 | Bowman et al. | 707/5 |
| 6,138,113 A | 10/2000 | Dean et al. | 707/2 |
| 6,285,999 B1 | 9/2001 | Page | |
| 6,286,006 B1 | 9/2001 | Bharat et al. | 707/100 |
| 6,292,796 B1 | 9/2001 | Drucker et al. | 707/5 |
| 6,321,220 B1 | 11/2001 | Dean et al. | 707/3 |
| 6,339,773 B1 | 1/2002 | Rishe | 707/4 |
| 6,360,215 B1 * | 3/2002 | Judd et al. | 707/3 |
| 6,401,118 B1 | 6/2002 | Thomas | 707/4 |
| 6,434,556 B1 | 8/2002 | Levin et al. | 707/5 |
| 6,681,247 B1 | 1/2004 | Payton | |
| 7,107,227 B1 | 9/2006 | Bezos et al. | |
| 2006/0155751 A1 * | 7/2006 | Geshwind et al. | 707/102 |

OTHER PUBLICATIONS

Kaindl et al., "Combining Structure Search and Content Search for the World-Wide Web", Proceedings of the Ninth ACM Conference on Hypertext and Hypermedia, pp. 217-224; Pittsburgh, Pa, 1998.*

(Continued)

*Primary Examiner*—Jeffrey Gaffin
*Assistant Examiner*—Michael J. Hicks
(74) *Attorney, Agent, or Firm*—Harrity Snyder, LLP (57) ABSTRACT

A system provides search results relating to a point-of-view (POV). The system obtains a search query and POV data. The system generates a list of documents based on the search query and filters the list of documents based on the POV data. Alternatively, the system may perform a search based on the search query and the POV data to generate the list of documents. In either case, the system then presents the list of documents as the result of the search.

35 Claims, 7 Drawing Sheets

OTHER PUBLICATIONS

Meng et al., "Improve Web Search Accuracy Using Personalized Profile", University of Texas—Pan America, Department of Computer Science; Jan. 1999.*

Hansen et al., "Using navigation data to improve IR functions in the context of Web search,", Proceedings of the tenth International conference on Information and knowledge management; Atlanta, Georgia, USA; pp. 135-142; ACM Press, 2001.*

Fitzpatrick et al., "Automatic Feedback Using Past Queries: Social Searching?", SIGIR 97, Philadelphia, Pa; ACM, 1997.*

Diligenti et al. "Focused Crawling Using Context Graphs", Proceedings of the 26th VLDB Conference, pp. 527-534; 2000.*

Kim et al. "An improved Computation of the PageRank Algorithm", ECIR 2002, LNCS 2291, pp. 73-85,Springer-Verlag Berlin Heidelberg 2002.*

Pitkow et al., "Personalized Search", Communications of the ACM, vol. 45, Issue 9 (Sep. 2002), pp. 50-55.*

Finkelstein et al., "Placing search in context: the concept revisited", Proceedings of the 10th international conference on World Wide Web, pp. 406-414; ACM, 2001.*

Jon M. Kleinberg; "Authoritative Sources in a Hyperlinked Environment"; Technical Report RJ10076; IBM; May 1997; pp. 1-33 and Abstract.

U.S. Appl. No. 09/734,901; Hoelzle et al.; filed Dec. 13, 2000; Systems and Methods for Performing In-Context Searching; 48 pages.

D. Koller et al., "Hierarchically Classifying Documents Using Very Few Words," International Conference on Machine Learning, 1997, pp. 170-178.

J. Dean et al., "Finding Related Web Pages in the World Wide Web," Eighth International World Wide Web Conference, May 1999, pp. 389-401.

Gerald Salton, Chris Buckley: "Term Weighting Approaches in Automatic Text Retrieval," Information Processing and Management 24(5): 513-523 (1988).

S. Brin and L. Page. "The anatomy of a large-scale hypertextual web search engine," In Proceedings of the Seventh International World Wide Web Conference 1998, pp. 107-117.

Lewis, D., "Evaluating and Optimizing Autonomous Text Classification Systems," SIGIR 95: Proceedings of the Eighteenth Annual International ACM-SIGIR Conference on Research and Development in Information Retrieval, Jul. 1995, pp. 246-254.

* cited by examiner

SYSTEMS AND METHODS FOR PERFORMING POINT-OF-VIEW SEARCHING

RELATED APPLICATION

This application claims priority under 35 U.S.C. §119 based on U.S. Provisional Application No. 60/363,558, filed Mar. 13, 2002, the disclosure of which is incorporated herein by reference.

BACKGROUND OF THE INVENTION

1. Field of the Invention

The present invention relates generally to information retrieval systems and, more particularly, to systems and methods for performing point-of-view searching.

2. Description of Related Art

Conventional techniques for searching, such as for searching a hypertext medium such as the World Wide Web ("web"), are replete with deficiencies. For example, current search engines permit only key word searching, possibly extended by features, such as restricting the answer set to a given domain or a given host.

One technique permits a user to specify one or a set of Uniform Resource Locators (URLs) as "authoritative." Similarly, another set can be specified as lacking in authority. This technique is based on finding hubs and authorities via the Hyperlink-Induced Topic Search (HITS) algorithm. The underlying information used for the computation is a co-citation index. The goal of the technique is to modify the co-citation index in such a way that the "authority" increases for positive examples and decreases for negative examples. Thus, the authority of other URLs can be changed.

There are two main problems with this approach. First, the co-citation index must be computed, which limits the size of the underlying link graph. For this and other reasons, the link graph is restricted to documents in the neighborhood of documents containing search query terms. For an arbitrary query, the likelihood that a "good" or "bad" example URL is in this small neighborhood is remote. Furthermore, the underlying HITS algorithm has numerous shortcomings (e.g., topic drift and spammability) which may affect the performance of this technique.

As a result, there exists a need for a mechanism that provides search results that are related to a defined set of information, such as URLs.

SUMMARY OF THE INVENTION

Systems and methods consistent with the present invention address this and other needs by providing mechanisms for limiting results of a search query to documents related to a given set of information, such as URLs. As a result, a user may be presented with more relevant search results. As used herein, the term "documents" is to be interpreted broadly to include any type of paper or electronic data or file, including audio, video, image, text data/files, etc. As will be appreciated by those skilled in the art, a document, as used herein, may be a single file or a combination of files with or without embedded links to other files.

In accordance with the principles of the invention as embodied and broadly described herein, a system provides search results relating to a point-of-view (POV). The system obtains a search query and POV data. The system generates a list of documents based on the search query and filters the list of documents based on the POV data. The system then presents the filtered list as a result of the search.

According to another implementation consistent with the present invention, a system provides search results relating to a POV. The system receives a search query from a user, obtains POV data, and uses the POV data to augment the search query. The system identifies documents based on the augmented search query and presents the identified documents to the user.

According to yet another implementation consistent with the present invention, a method for performing a search from a POV includes receiving a request for a search; obtaining POV data that defines the POV for the search; performing a search of documents based on the POV data; generating a list of documents as a result of the search; and presenting the list of documents.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the invention is defined by the appended claims and equivalents.

Systems and methods consistent with the present invention provide search results to a point-of-view (POV). A POV may be defined by key words, a set of addresses or Uniform Resource Locators (URLs), or other information. For example, such other information may include a user's browsing history (including information such as sites or documents visited and amount of time spent), categories specified by a user or otherwise derived from user interactions such as search history, browsing history, etc., word vectors derived from sites or documents visited and various well-known information retrieval (IR) techniques, etc. POV searching may also be thought of as personalized searching, in which case POV data may correspond to personalization data, such as the types of information described above or many other types of data. As a result, the user is presented with more relevant results than obtained by conventional information retrieval systems.

Exemplary Network Configuration

Figure 1:
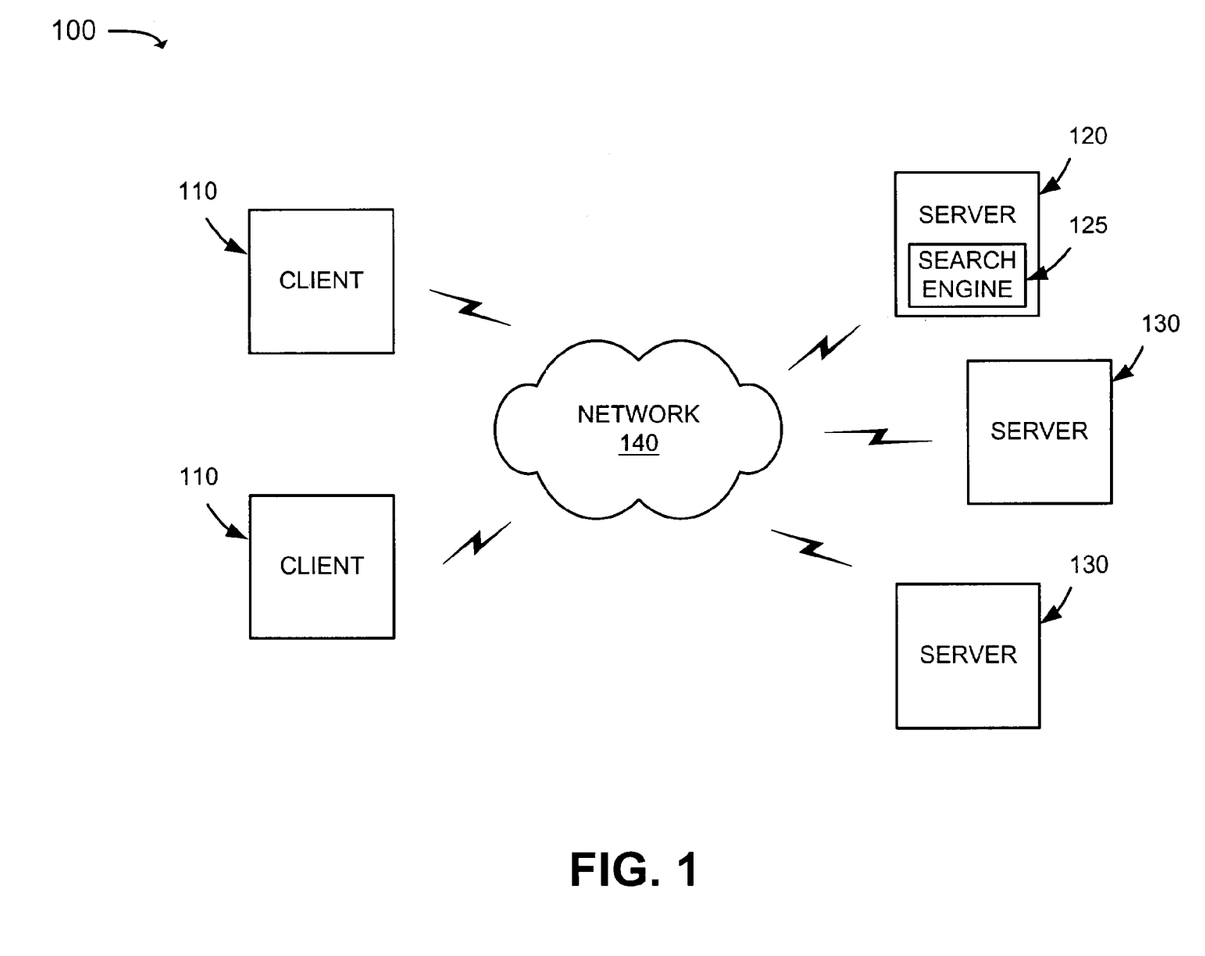
FIG. 1 is a diagram of an exemplary network in which systems and methods consistent with the present invention may be implemented.

FIG. 1 is an exemplary diagram of a network 100 in which systems and methods consistent with the present invention may be implemented. The network 100 may include multiple clients 110 connected to multiple servers 120-130 via a network 140. The network 140 may include a local area network (LAN), a wide area network (WAN), a telephone network, such as the Public Switched Telephone Network (PSTN), an intranet, the Internet, a similar or dissimilar network, or a combination of networks. Two clients 110 and three servers 120-130 have been illustrated as connected to network 140 in FIG. 1 for simplicity. In practice, there may be more or less clients and servers. Also, in some instances, a client may perform the functions of a server and a server may perform the functions of a client.

The clients 110 may include devices, such as wireless telephones, personal computers, personal digital assistants (PDAs), lap tops, or other types of communication devices, threads or processes running on these devices, and/or objects executable by these devices. The servers 120-130 may include server devices, threads, and/or objects that operate upon, search, maintain, or manage documents in a manner consistent with the present invention. The clients 110 and servers 120-130 may connect to the network 140 via wired, wireless, or optical connections.

In an implementation consistent with the present invention, the server 120 may include a search engine 125 usable by the clients 110. The servers 130 may store or manage documents, such as web documents or web pages, accessible by the clients 110 and the server 120.

Exemplary Server Architecture

Figure 2:
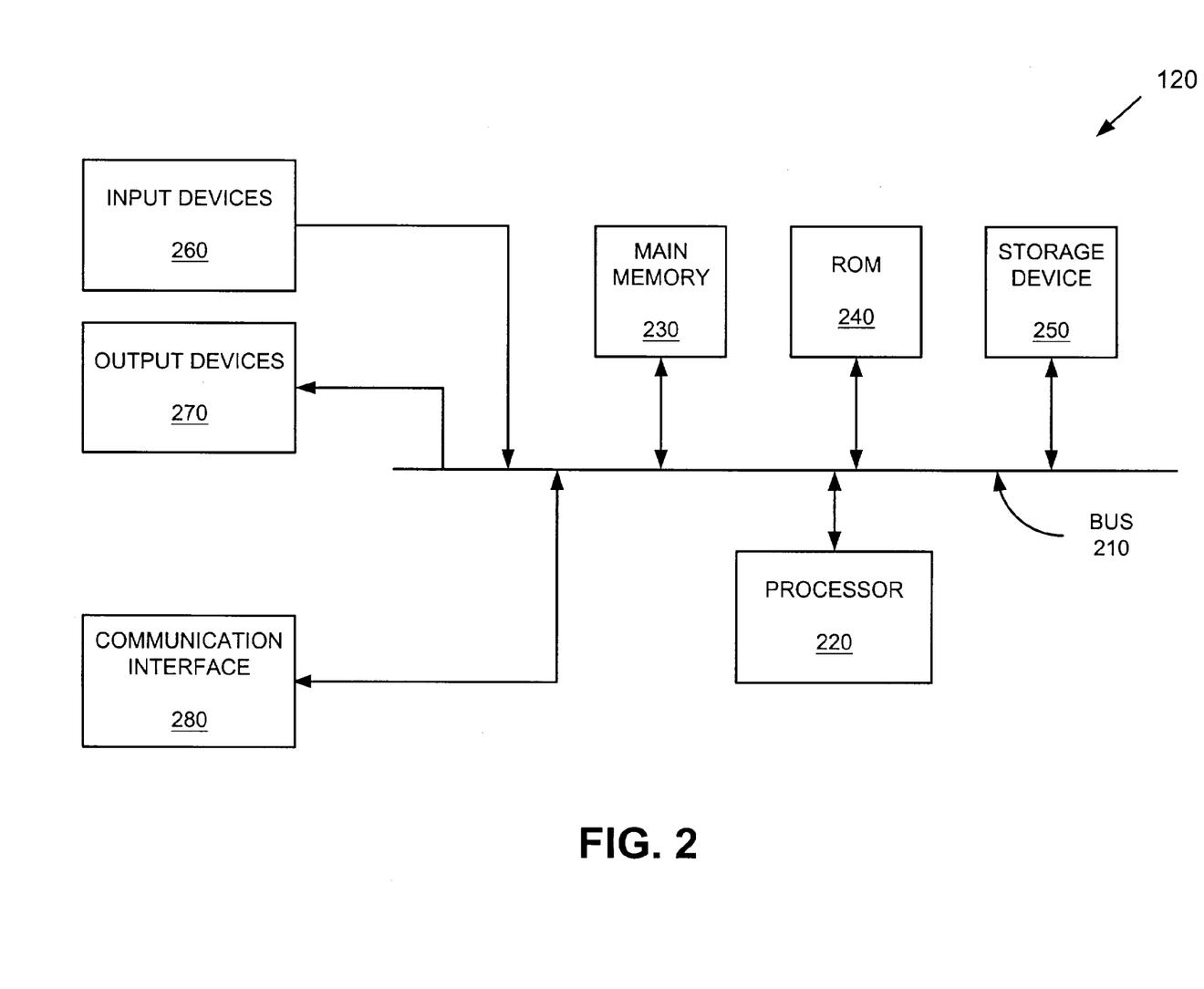
FIG. 2 is an exemplary diagram of a server of FIG. 1 in an implementation consistent with the present invention.

FIG. 2 is an exemplary diagram of the server 120 in an implementation consistent with the present invention. The server 120 may include a bus 210, a processor 220, a main memory 230, a read only memory (ROM) 240, a storage device 250, one or more input devices 260, one or more output devices 270, and a communication interface 280. The bus 210 may include one or more conductors that permit communication among the components of the server 120.

The processor 220 may include any type of conventional processor or microprocessor that interprets and executes instructions. The main memory 230 may include a random access memory (RAM) or another type of dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive.

The input devices 260 may include one or more conventional mechanisms that permit an operator to input information to the server 120, such as a keyboard, a mouse, a pen, voice recognition and/or biometric mechanisms, etc. The output devices 270 may include one or more conventional mechanisms that output information to the operator, including a display, a printer, a speaker, etc. The communication interface 280 may include any transceiver-like mechanism that enables the server 120 to communicate with other devices and/or systems. For example, the communication interface 280 may include mechanisms for communicating with another device or system via a network, such as network 140.

As will be described in detail below, the server 120, consistent with the present invention, perform certain searching-related operations. The server 120 may perform these operations in response to processor 220 executing software instructions contained in a computer-readable medium, such as memory 230. A computer-readable medium may be defined as one or more memory devices and/or carrier waves.

The software instructions may be read into memory 230 from another computer-readable medium, such as the data storage device 250, or from another device via the communication interface 280. The software instructions contained in memory 230 causes processor 220 to perform processes that will be described later. Alternatively, hardwired circuitry may be used in place of or in combination with software instructions to implement processes consistent with the present invention. Thus, the present invention is not limited to any specific combination of hardware circuitry and software.

Exemplary Computer-Readable Medium

Figure 3:
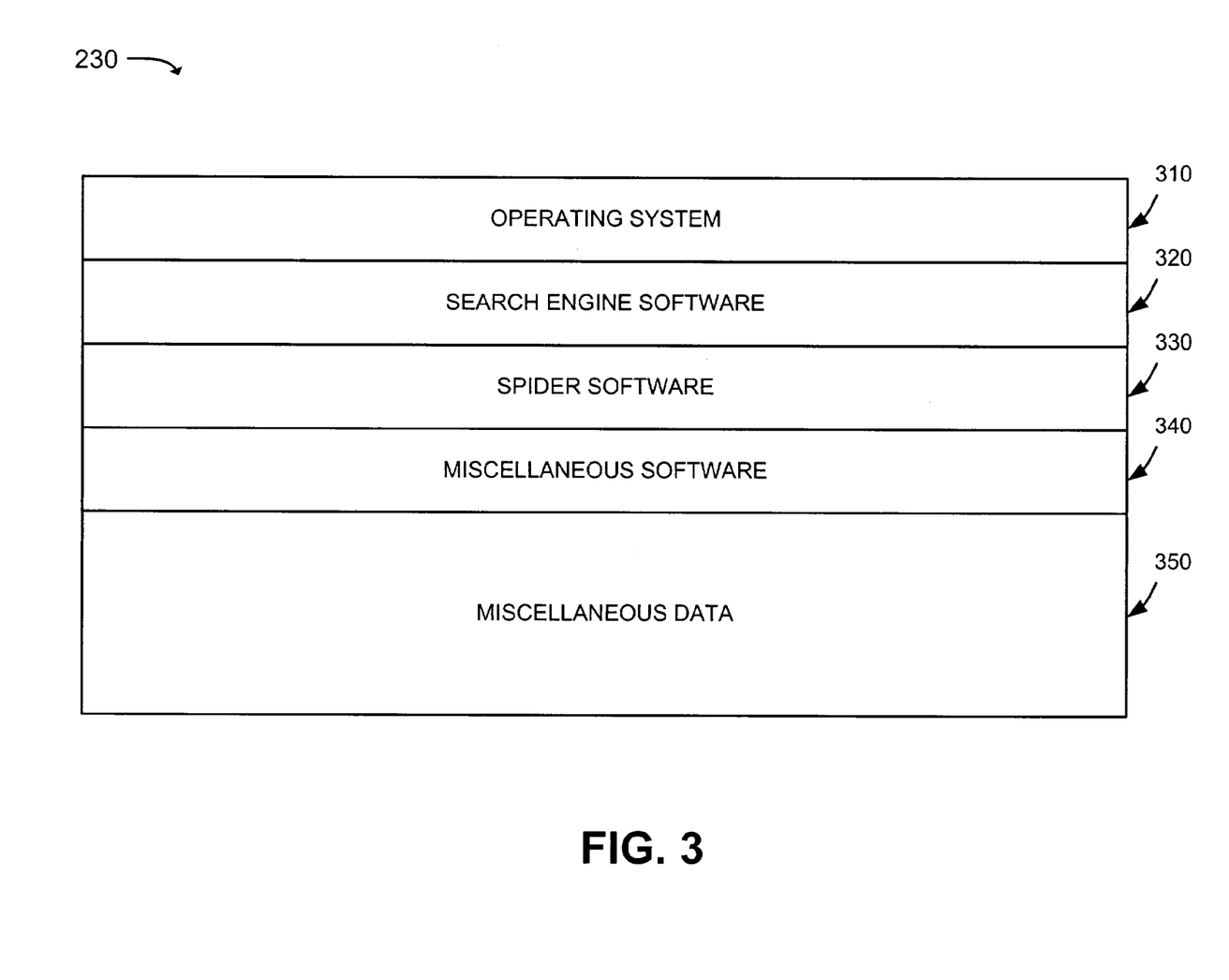
FIG. 3 is a diagram of an exemplary computer-readable medium used by the server of FIG. 2 according to an implementation consistent with the present invention.

FIG. 3 is a diagram of an exemplary computer-readable medium used by the server 120 according to an implementation consistent with the present invention. In this implementation, the computer-readable medium includes memory 230 or a combination of memory 230 and another memory, such as storage device 250 or an external memory. The memory 230 may include an operating system 310, search engine software 320, spider software 330, miscellaneous other software 340, and miscellaneous data 350.

The operating system 310 may include conventional operating system software, such as the Windows, Unix, or Linux operating systems. The search engine software 320 may include software for implementing the search engine 125. The search engine 125 may identify one or more documents or a list of documents in response to a request, such as one or more search terms, from a user. For example, the search engine 125 may receive a search query from a user and respond by returning relevant information or a list of relevant information to the user. Typically, users may ask the server 120 to locate web documents relating to a particular topic that are stored at other devices or systems connected to network 140 or another network. The search engine 125 may access a database to obtain results from a document corpus, stored in the database, by comparing the terms in the user's search query to the documents in the corpus. The information in the document corpus may be gathered by the spider software 330.

The spider software 330 may include software that "crawls" web documents on network 140 based on their hyperlinks. As a result, the spider software 330 generates a tree or directed graph of linked web documents. The crawled documents may be stored in the database as an inverted index in which each term in the corpus is associated with all the crawled documents that contain that term.

Figure 4:
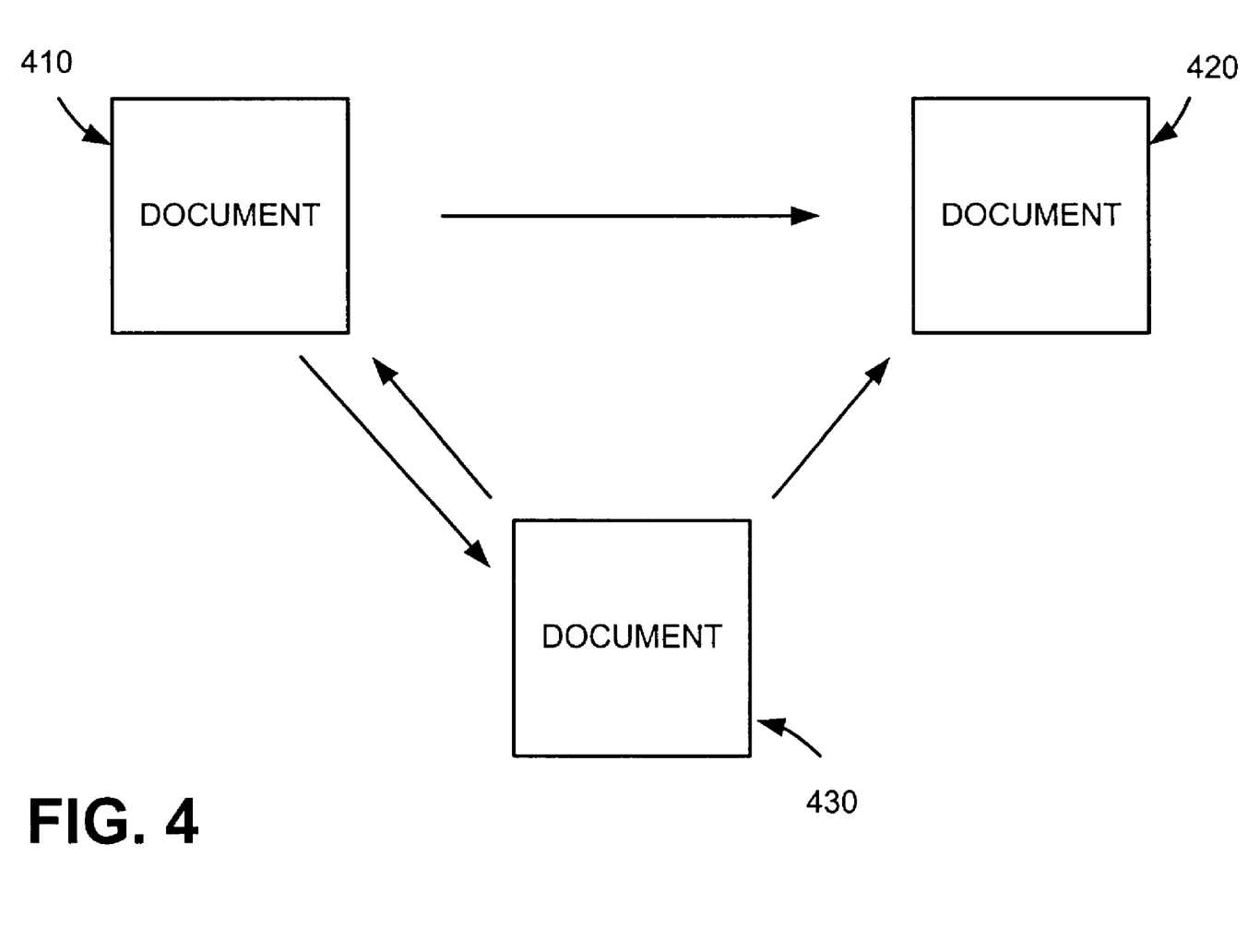
FIG. 4 is a diagram illustrating relations between an exemplary set of web documents that may be gathered by the spider software of FIG. 3.

FIG. 4 is a diagram illustrating relations between an exemplary set of web documents that may be gathered by the spider software 330. Documents 410-430 contain links to each other. In the nomenclature of the popular Hyper-Text Markup Language (HTML) standard, hyperlinks to other documents are specified using an HTML structure called an anchor. An anchor specifies the URL of the document being linked. Typically, browsers display anchors as text distinct from the main text using, for example, underlining or different colors. A user, by selecting the anchor, causes the browser to retrieve the web document specified by the URL.

In FIG. 4, documents 410-430 contain various links. In particular, document 410 contains one backlink to document 430 and two forward links (i.e., one to document 420 and one to document 430). Document 420 contains two backlinks (i.e., one to document 410 and one to document 430). Document 430 contains one backlink to document 410 and two forward links (i.e., one to document 410 and one to document 420).

Returning to FIG. 3, the miscellaneous other software 340 and miscellaneous data 350 may include programs and data used by the server 120 to perform searching-related and non-searching-related operations. In some implementations, for example, the miscellaneous data 350 may include the document corpus gathered by the spider software 330. In other implementations, the corpus is stored in a memory external to the server 120.

Exemplary Processing for POV Searching

Figure 5:
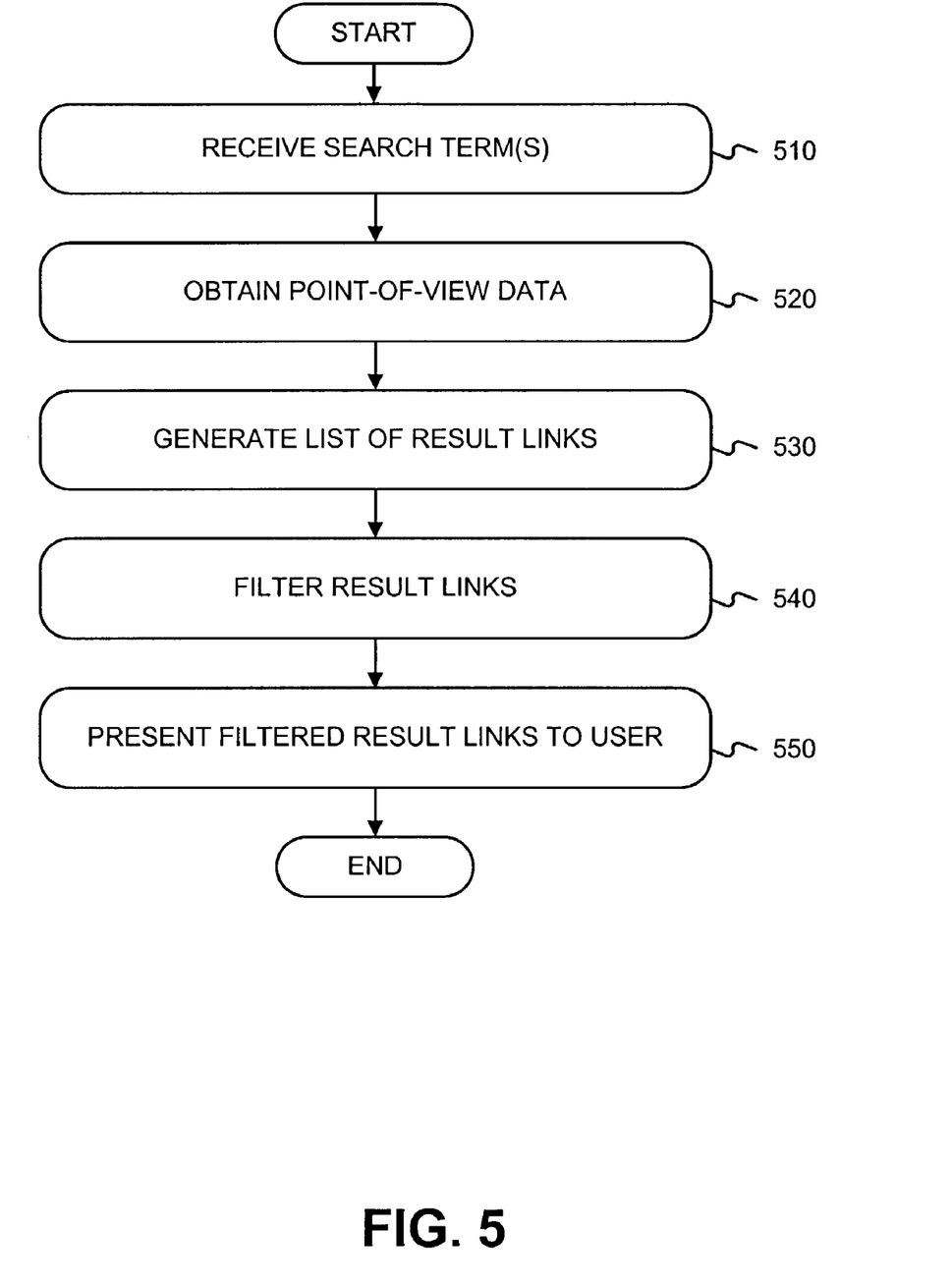
FIG. 5 is a flowchart of exemplary processing for performing point-of-view (POV) searching in accordance with an implementation consistent with the present invention.

FIG. 5 is a flowchart of exemplary processing for performing POV searching in accordance with an implementation consistent with the present invention. Processing may begin with a user accessing the server 120 (FIG. 1) using, for example, web browser software on a client, such as client 110. The user may then provide a query that includes one or more search terms to the search engine 125 maintained by the server 120 (act 510).

The search engine 125 may obtain POV data from the user, the browser software, or elsewhere (act 520). In one implementation, the POV data may include a set of URLs that act as examples of on-topic or off-topic documents. For example, a user may specify URLs related to jaguars, but add negative URLs related to Jaguar brand cars. In another implementation, the URL of the document currently displayed by the browser software may be used as an example of an on-topic URL. In yet another implementation, the browser software may provide the URLs included in the user's "bookmarks" or "favorites" list to the search engine 125 for use as examples of on-topic URLs. In this case, the browser software may automatically provide the list of URLs to the search engine 125 or may present the list to the user for selection of one or more of the URLs prior to providing the list to the search engine 125.

In another implementation, a database may include URLs that the user has previously selected (e.g., clicked on), that were returned in the top N results of a previous query by the user, that the user has visited recently or in some time period, etc., or that can be determined to be related to such URLs. As used herein, the term "recently" may refer to an absolute time period (such as within the last M minutes, where M can be a predetermined number or a number that is calculated dynamically, e.g., according to the user's browsing habits and browsing history). Alternatively, "recently" may also be a relative measure. For example, recently viewed documents may refer to the last Y number of documents viewed, regardless of the time when the documents were viewed. Of course, "recently" may also refer to a combination of absolute and relative measures. These URLs can be added to the POV data. Alternatively, the URLs can first be filtered to determine whether they are on-topic. Those URLs that are on-topic can be added to the POV data. As another alternative, the URLs in the database can be clustered by topic. When the user performs the POV search, the clusters that are relevant to the topic of the search can be identified and the URLs from the relevant clusters can be added to the POV data.

In an implementation consistent with the present invention, the search engine 125 may perform one or more operations to expand the set of on-topic URLs. For example, the search engine 125 may obtain a few key words, either from the examples of on-topic URLs or from the user. The search engine 125 may then perform a search to obtain a collection of additional on-topic URLs. The search engine 125 may then add these additional URLs to the set of on-topic URLs. According to another implementation, the search engine 125 may identify URLs that are co-cited with the set of on-topic URLs. The search engine 125 may then add the co-cited URLs to the set of on-topic URLs.

In an alternate implementation, the POV data may include one or more words that identify on-topic or off-topic documents. The search engine 125 may obtain the words from an example set of URLs, from the user (either explicitly or implicitly), from personalization data, or from various techniques, such as those disclosed previously. For example, a user may specify positive and/or negative key words that identify URLs that are on-topic or off-topic.

In yet another implementation, the POV data may include a category or list of categories. The category may correspond to categories within a hierarchical directory, such as an open directory, maintained by the search engine 125 or by another device or server. For example, the search engine 125 may maintain a hierarchical directory based on periodic crawling of the network 140 by the spider software 330. For each category in the hierarchical directory, the search engine 125 may record a list of URLs and other information that correspond to that category. The search engine 125 may present a selectable list of categories to the user.

In a further implementation, the POV data may include data relating to one or more searches that the user has previously performed and/or key words from documents (e.g., web pages or their anchor text) that the user has selected (e.g., clicked on) or that were returned in the top N results for a search by the user. This data may be stored in a database. When the user performs a POV search, the key words can be used to automatically augment the query. For example, if the user has previously performed a search for "tigers" and "elephants," then "mammals" might be one of the key words extracted based on the search. When the user later performs a POV search "jaguar," then "mammals" might be automatically added to the search query.

Figure 6:
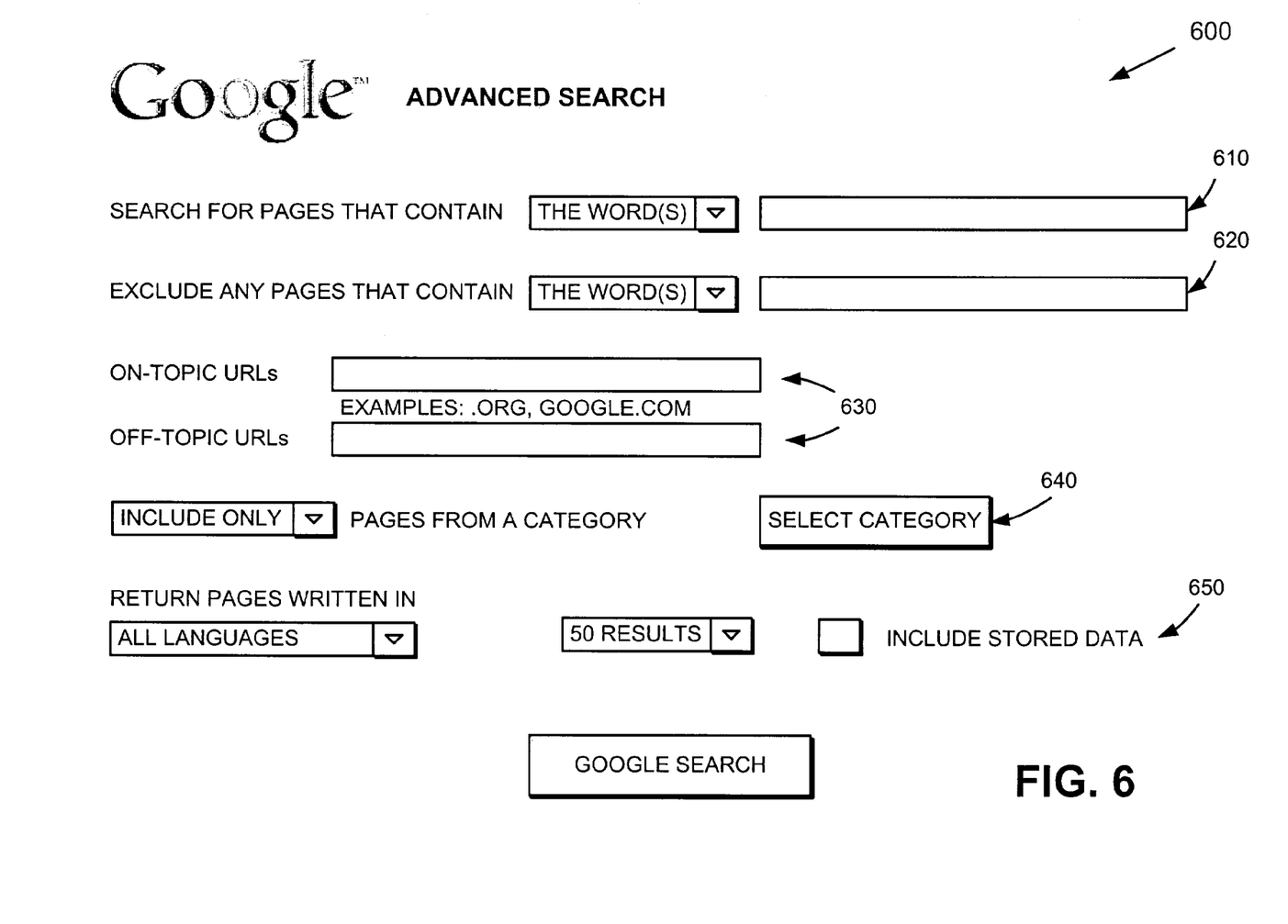
FIG. 6 is a diagram of an exemplary graphical user interface that may be presented to the used to facilitate the providing of POV data.

FIG. 6 is a diagram of an exemplary graphical user interface (GUI) 600 that may be presented to the user to facilitate the providing of POV data. The GUI 600 may prompt the user to enter one or more search terms/words to include (box 610) or exclude (box 620) in the search results. The GUI 600 may also prompt the user to provide on-topic URLs and off-topic URLs (box 630) or a category (box 640) for use in determining the set of on-topic and off-topic URLs. The category may correspond to categories within a hierarchical directory, such as an open directory, maintained by the search engine 125 or by another device or server. The GUI 600 may further prompt the user as to whether the user desires to include previously stored data (e.g., data derived from previous search-related activities of the user) (box 650).

Returning to FIG. 5, the search engine 125 may generate data that contains the search results in a conventional manner (act 530). In an implementation consistent with the present invention, the search engine 125 provides the search results as an HTML document, similar to search results provided by conventional search engines. Alternatively, the search engine 125 may provide the search results according to a protocol agreed upon by the server 120 and the client 110.

In an implementation consistent with the present invention, the search results include references (e.g., links) to documents (e.g., web pages) and possibly a textual description of the links. In another implementation, the search results include references (e.g., links) to directory nodes within a hierarchical directory and possibly textual descriptions for the directory nodes. In other implementations, the search results include a combination of these references or the documents themselves.

If a POV search has been specified, as described above (e.g., the user has entered information via GUI 600), the search engine 125 may filter the result links to present links related to the POV data (act 540). While the filtering is being described as an act separate from the act of generating the list of result links, these two acts may be concurrently performed as part of the same act.

Figure 7:
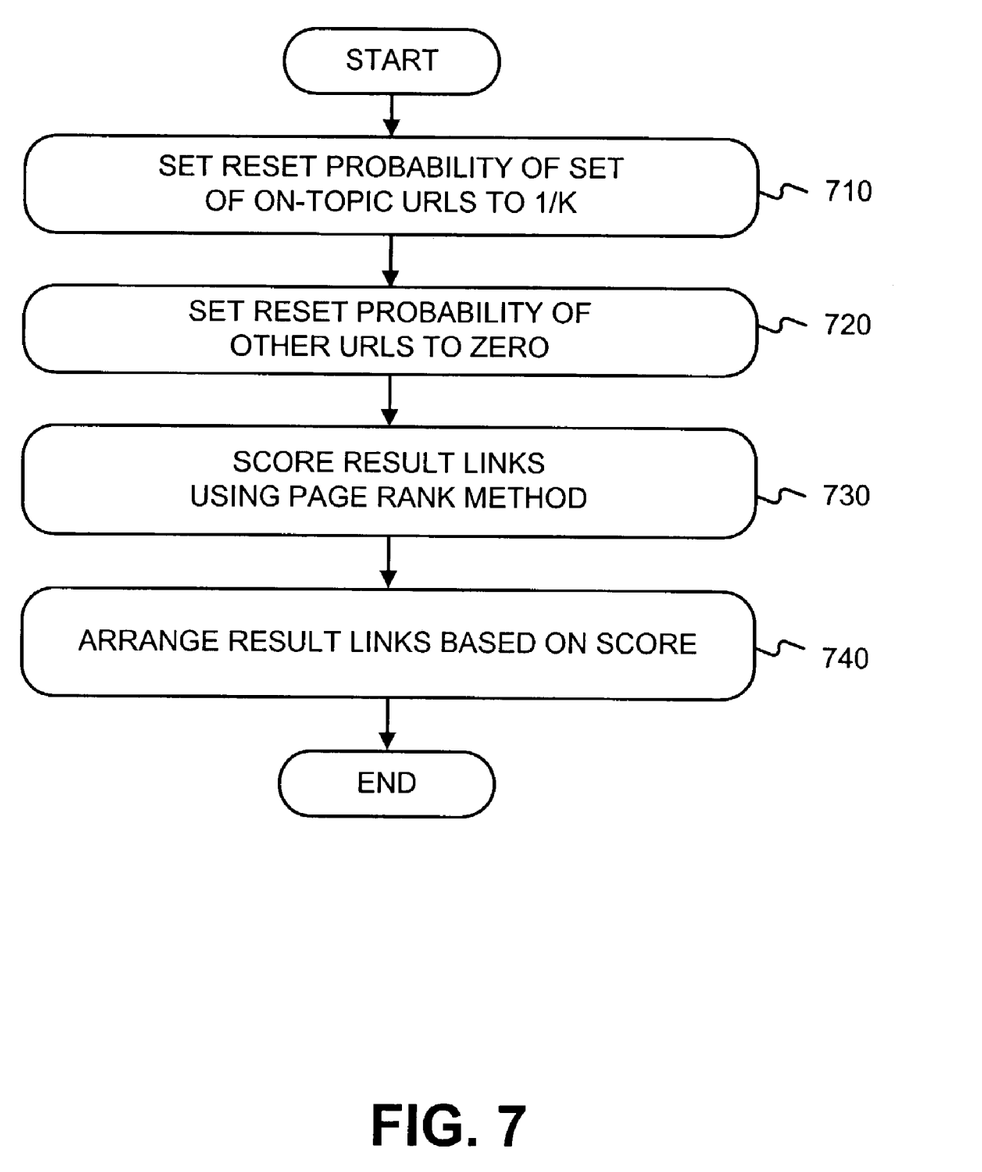
FIG. 7 is a flowchart of exemplary processing for filtering result links based on POV data according to an implementation consistent with the present invention.

FIG. 7 is a flowchart of exemplary processing for filtering result links based on POV data according to an implementation consistent with the present invention. The search engine 125 may use a document ranking method, such as the PageRank™ method described in U.S. Pat. No. 6,285,999, which is incorporated herein by reference.

Briefly, the PageRank™ of a web document is the probability that a web surfer who is surfing at random will be at a document at any time. In other words, the PageRank™ is the stationary distribution of the random walk process on a graph of the web. Since the web contains many sinks, where the walk cannot follow a forward link, a set of documents is assigned a non-zero "reset" probability and whenever a sink is reached, the walk "jumps" to a randomly selected document in the set, according to the reset probabilities in the set. The reset probability of a document is the probability of landing on that document during a random reset.

According to one implementation of the PageRank™ method, the backlinks from different documents are weighted differently and the number of links in each document is normalized. The PageRank™ method considers a citation from a highly ranked backlink as more important than a citation from a lowly ranked backlink (provided both citations come from backlink documents that have an equal number of forward links). According to the PageRank™ method, it is possible for a document with only one backlink (from a very highly ranked document) to have a higher rank than another document with many backlinks (from very low ranked documents).

The rank or score of a document may be defined according to:

$$r(A) = \alpha * \frac{i(A)}{k} + (1-\alpha)\left(\frac{r(B_1)}{|B_1|} + \ldots + \frac{r(B_n)}{|B_n|}\right),$$

where A is the document being ranked; $B_1, \ldots, B_n$ are the backlink documents of document A; $r(B_1), \ldots, r(B_n)$ are the ranks of documents $B_1, \ldots, B_n$; $|B_1|, \ldots, |B_n|$ are the number of forward links for documents $B_1, \ldots, B_n$; $\alpha$ is a constant in the interval [0,1]; k is the number of on-topic URLs; and i(A) is set to one if A is in the set of on-topic URLs and reset to zero otherwise.

The ranks form a probability distribution over web documents, so that the sum of ranks over all web documents is unity. The rank of a document can, therefore, be defined as the probability that a surfer will be at the document after following a large number of forward links. The constant $\alpha$ in the above equation may be interpreted as the reset probability that the web surfer will jump randomly to any web page instead of following a forward link.

For the filtering process, the search engine 125 may set the reset probability of the URLs in the set of on-topic URLs to 1/k, where k is the total number of URLs in the set (act 710). The search engine 125 may set the reset probability of all other URLs to zero (act 720).

Not all URLs need to be treated the same. For example, some URLs may be more on topic than others and may, therefore, be given a higher weight. A function f may be defined on the set of documents, such that f(A)=0 if A is not in the set of on-topic URLs; and f(A)=w(A) if A is in the set of on-topic URLs, where w(A) is the weight of the URL.

The sum of f(A) over all documents may equal one.

The rank or score of a document may then be defined according to:

$$r(A) = \alpha * \frac{f(A)}{k} + (1-\alpha)\left(\frac{r(B_1)}{|B_1|} + \ldots + \frac{r(B_n)}{|B_n|}\right),$$

where $A, B_1, \ldots, B_n, r(B_1), \ldots, r(B_n), |B_1|, \ldots, |B_n|, \alpha,$ and k are defined above.

The search engine 125 may then score the result links using one of the ranking methods described above (act 730). The rank flows from the documents corresponding to the example URLs to all other documents. Documents that are easily reached from the example documents obtain a high rank. As a result, documents close to the example documents are likely to be returned higher in the rankings for queries to which they match. The search engine 125 may then arrange the documents in the result links based on their scores (act 740).

In an alternate implementation consistent with the present invention, the relative probabilities of traversing links within the web graph may be changed. For example, if a link leads toward documents that are on-topic, then it may be favored over links that lead toward documents that are off-topic. Various methods, including local optimization methods, may be used to compute appropriate edge probabilities to maximize the POV of the web graph. For example, the weights w(A) may be modified based on favored and/or unfavored links to maximize the POV.

In yet another implementation consistent with the present invention, the on-topic URLs may be added to the filtered results. For example, the best result might be one that the user saw before and was in the on-topic URLs, but not in the search results.

Returning to FIG. 5, the search engine 125 may then present the filtered results to the user (act 550). The search engine 125 may also rank the results in some manner, such as by assigning scores to the links or by alphabetizing them.

The search engine 125 may present the filtered result links as a web page in a browser window. Alternatively, the search engine 125 may present the filtered result links as a list of selectable items within a user interface, such as a pull-down or pop-up menu, a side-bar, or a scrollable list.

If the search engine 125 implements a directory hierarchy, the results of a search may include a list of top ranked directory hierarchy nodes. In this case, the search engine 125 may download the links corresponding to the top ranked directory hierarchy nodes and display them instead of or in addition to the text of the top ranked directory hierarchy nodes.

CONCLUSION

Systems and methods consistent with the present invention permit a user to limit search results to a defined POV, such as documents related to an example set of URLs. As a result, systems and methods consistent with the present invention provide meaningful search results to the user.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 5 and 7, the order of the acts may be modified in other implementations consistent with the present invention.

While it has been described that the search engine 125 performs the acts described above with regard to FIGS. 5 and 7, this need not be the case. In other implementations consistent with the present invention, one or more other devices, such as another server 130 or a client 110, may perform one or more of the acts.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method for providing search results relating to a point-of-view (POV), comprising:
 obtaining a search query;
 storing POV data prior to obtaining the search query, the POV data including a set of Uniform Resource Locators (URLs), where a URL in the set of URLs is associated with a document previously accessed by a user;
 generating a list of documents based on the search query;
 filtering the list of documents based on the POV data; and
 presenting the filtered list of documents.

2. The method of claim 1, wherein the set of URLs includes URLs associated with on-topic documents related to the POV.

3. The method of claim 2, wherein the set of URLs includes URLs associated with off-topic documents unrelated to the POV.

4. The method of claim 1, further comprising:
 expanding the set of URLs.

5. The method of claim 4, wherein the expanding the set of URLs includes:
 obtaining one or more key words,
 performing a search using the one or more key words,
 identifying one or more URLs based on the search, and
 adding one or more of the identified URLs to the set of URLs.

6. The method of claim 5, wherein the obtaining one or more key words includes:
 identifying the one or more key words from the set of URLs.

7. The method of claim 5, wherein the obtaining one or more key words includes:
 receiving the one or more key words from a user.

8. The method of claim 4, wherein the expanding the set of URLs includes:
 identifying one or more URLs that are co-cited with the set of URLs, where one of the identified URLs is co-cited with a URL in the set of URLs when a document exists that points to both a document associated with the one identified URL and a document associated with the URL in the set of URLs, and
 adding one or more of the identified URLs to the set of URLs.

9. The method of claim 1, further comprising:
 including a URL, corresponding to a document currently accessed by a user that provided the search query, in the set of URLs.

10. The method of claim 1, further comprising:
 including a URL, corresponding to a document recently accessed by a user that provided the search query, in the set of URLs.

11. The method of claim 1, further comprising:
 identifying the set of URLs from a favorites list created by a user.

12. The method of claim 11, wherein the favorites list includes favorite web sites recorded by a web browser.

13. The method of claim 1, wherein the filtering the list of documents includes:
 setting a reset probability of URLs in the set of URLs to 1/k, where k represents a total number of URLs in the set of URLs, and
 assigning scores to documents in the list of documents using a document ranking method based on the reset probabilities of the URLs in the set of URLs.

14. The method of claim 13, wherein the assigning scores to documents includes:
 setting a reset probability of other URLs to zero, and
 assigning scores to documents in the list of documents using a document ranking method based on the reset probabilities of the URLs in the set of URLs and the reset probabilities of the other URLs.

15. The method of claim 13, further comprising:
 arranging the scored documents according to the assigned scores.

16. The method of claim 1, wherein the filtering the list of documents includes:
 assigning scores to links associated with documents in the list of documents.

17. The method of claim 16, wherein the filtering the list of documents further includes:
 weighting a first one of the links that leads toward a document more relevant to the POV higher than a second one of the links that leads toward a document less relevant to the POV.

18. The method of claim 17, wherein the filtering the list of documents further includes:
 assigning scores to the links using a document ranking method and the weighting of the links.

19. The method of claim 1, wherein the set of URLs includes one or more URLs selected by a user.

20. The method of claim 19, further comprising:
 filtering the one or more URLs selected by the user to identify those of the one or more URLs relating to the search query.

21. The method of claim 1, wherein the set of URLs includes one or more URLs that were identified in association with a previous search.

22. The method of claim 21, further comprising:
 filtering the one or more URLs to identify those of the one or more URLs relating to the search query.

23. The method of claim 1, further comprising:
adding one or more of the URLs to the filtered list of documents.

24. The method of claim 1, wherein the storing POV data includes:
providing a database of URLs arranged in clusters by topic, and
identifying one or more clusters that are relevant to a topic of the search query.

25. The method of claim 1, wherein the storing POV data further includes:
obtaining one or more key words that identify documents that are related to the POV.

26. The method of claim 1, wherein the storing POV data further includes:
obtaining identification of one or more categories.

27. The method of claim 1, further comprising:
using the POV data to augment the search query.

28. The method of claim 1, wherein the storing POV data includes:
obtaining data from one or more prior searches by a user, and
using the data as the POV data.

29. The method of claim 1, wherein the storing POV data further includes:
obtaining key words from documents previously selected or obtained by a user, and
using the key words as the POV data.

30. The method of claim 1, wherein the filtering the list of documents based on the POV data includes: retrieving the POV data, and using the retrieved POV data to filter the list of documents.

31. A system for providing search results related to a defined point-of-view (POV), comprising:
a memory configured to store instructions; and
a processor configured to execute the instructions in the memory to:
obtain one or more search terms,
store POV data that defines a POV prior to obtaining the one or more search terms, the POV data including a set of addresses, where at least one of the addresses is associated with a favorites list associated with a user,
identify documents based on a search performed using the one or more search terms,
filter the identified documents based on the POV data, and
provide the filtered documents.

32. A computer readable memory device that includes instructions executable by at least one processor for implementing a search engine, comprising:
instructions for obtaining a search query from a user;
instructions for obtaining point-of-view (POV) data that defines a POV, the POV data including information regarding documents previously selected or obtained by the user, where the POV data is defined prior to obtaining the search query;
instructions for identifying documents based on the search query;
instructions for filtering the documents based on the POV data; and
instructions for providing the filtered documents.

33. A computer readable memory device that includes instructions executable by at least one processor for implementing a search engine, comprising:
instructions for obtaining a request for a search from a user;
instructions for receiving and storing point-of-view (POV) data that defines a POV for the search prior to obtaining the request for the search, the POV data including a set of addresses associated with documents currently or previously accessed by the user, where the documents include at least one on-topic document relating to the POV and at least one off-topic document unrelated to the POV;
instructions for performing a search of documents based on the POV data;
instructions for generating a list of documents as a result of the search; and
instructions for providing the list of documents.

34. A method for performing a search from a point-of-view (POV), comprising:
receiving a request for a search from a user;
storing POV data that defines the POV for the search prior to receiving the request for the search, the POV data including at least one of an address associated with a document currently accessed by the user, an address associated with a document recently accessed by the user, or a document associated with a favorites list of the user;
performing a search of documents based on the POV data;
generating a list of documents as a result of the search; and
presenting the list of documents.

35. A method for providing search results relating to a point-of-view (POV), comprising:
obtaining a search query from a user;
storing a set of Uniform Resource Locators (URLs) related to the POV prior to obtaining the search query from the user, where at least one URL in the set of URLs is associated with a document that was identified in association with a prior search query from the user;
generating a list of links to documents based on the search query;
filtering the list of links based on the set of URLs; and
presenting the filtered list of links.

* * * * *